United States Patent [19]

Pilarski

[11] 4,349,216
[45] Sep. 14, 1982

[54] FLOATING LOCK MOUNT FOR A SEAT BELT RETRACTOR

[75] Inventor: Regis V. Pilarski, Utica, Mich.

[73] Assignee: The Firestone Tire & Rubber Company, Akron, Ohio

[21] Appl. No.: 189,949

[22] Filed: Sep. 22, 1980

[51] Int. Cl.³ .............................................. B60R 21/10
[52] U.S. Cl. ................................. 280/807; 296/65 R; 297/474
[58] Field of Search ............... 280/806, 807, 808, 801; 296/65 R, 65 A; 297/468, 474, 475, 476; 248/429

[56] References Cited

U.S. PATENT DOCUMENTS

| 2,798,539 | 7/1957 | Johnson | 297/474 |
| 3,288,422 | 11/1966 | Krause | 297/468 |
| 3,323,829 | 6/1967 | Liem | 296/65 R |
| 3,363,712 | 1/1968 | Fontaine | 280/807 |
| 3,746,393 | 7/1973 | Andres | 297/468 |
| 3,897,101 | 7/1975 | Hess | 297/468 |
| 4,109,962 | 8/1978 | Magyar | 297/474 |

Primary Examiner—Robert R. Song

Attorney, Agent, or Firm—Miller, Morriss and Pappas

[57] ABSTRACT

A floating lock mount for a seat belt retractor is provided for application in situations where the seat or seats served by the retractor is shifted forwardly or rearwardly by the user so as to accommodate the positioning of legs and other physiognomy and to adjust the seating to the user. A track is provided which generally parallels the fore and aft movement of the seat. The retractor is attached to the seat frame and is connected to a sleeve operably on the track. As the seat is moved, the retractor and sleeve moves and relocates on the track in accord with fore and aft movement and vertical displacement. A plurality of ratchet teeth are provided on the track and spring means bias the retractor from lock engagement against the teeth. However, under upward stress by the webbing or seat belt, as felt in a sudden deceleration or projection of the body of the user, then the retractor tilts and pawl means connected to the retractor grab the ratchet teeth and secures the retractor against any further movement. Seat belt loads are transferred to the floor of the vehicle and the vehicle frame via the track.

6 Claims, 3 Drawing Figures

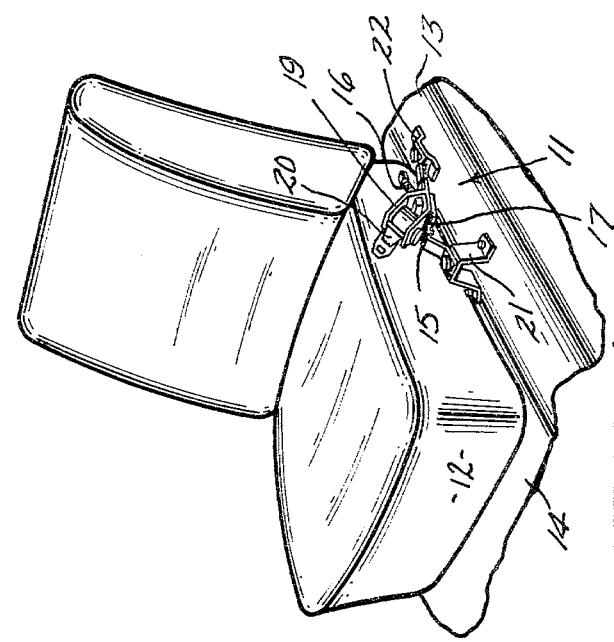
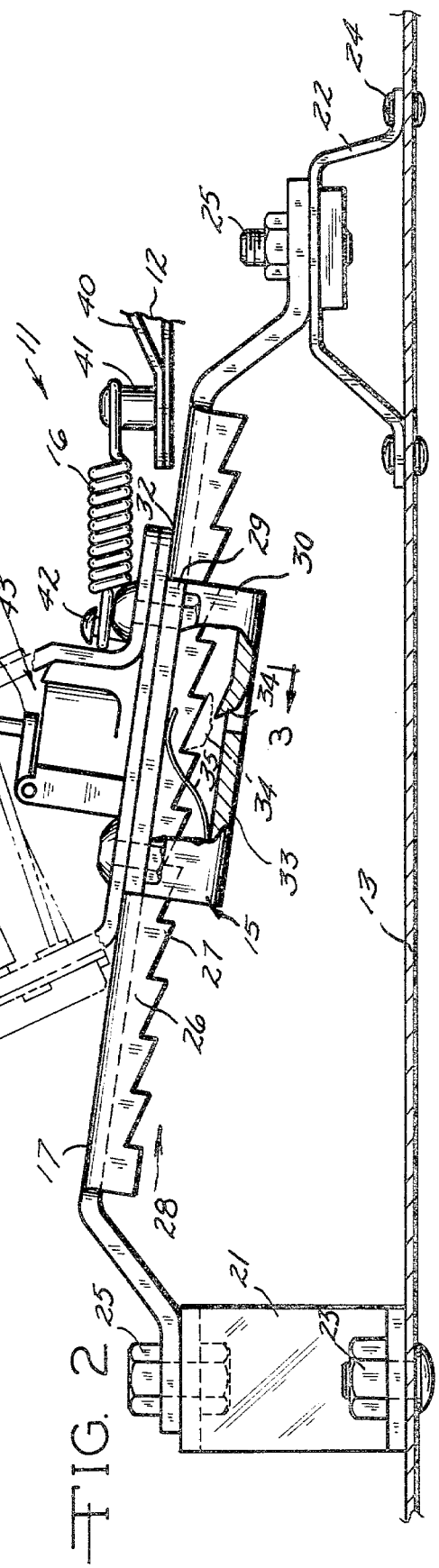
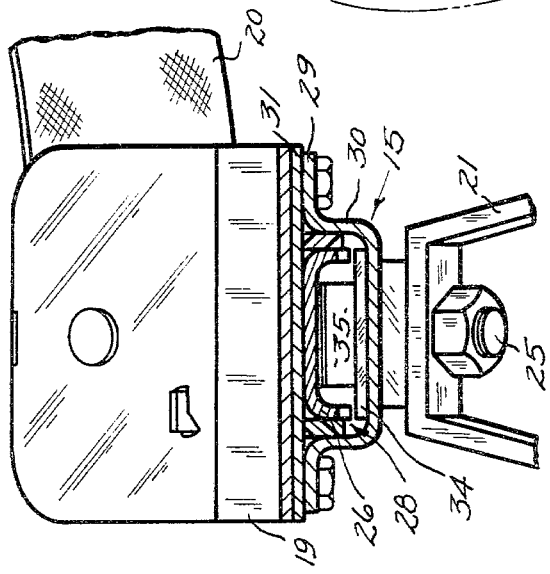

FLOATING LOCK MOUNT FOR A SEAT BELT RETRACTOR

The present invention is a floating lock mount for a seat belt retractor in which a track is attached to the vehicle adjacent adjustable seats therein and the track supports a sleeve to which is secured a retractor. The sleeve is movable on the track with the retractor and the sleeve and retractor are connected to the adjustable seat frame so that movement of the seat causes corresponding movement in the frame. Ratchet and pawl means between sleeve and track are engaged when upward force from webbing withdrawal from the retractor exceeds a light bias against engagement of pawl to ratchet.

BACKGROUND OF THE INVENTION

The floating lock mount for a seat belt retractor, as herein described, answers a long felt need to provide means to allow adjustment of a vehicle seat in fore and aft directions without seriously altering the lead-out of webbing across and over the user. Most requirements advise that the seat belt anchor points should directly transmit stresses into the floor and frame of the vehicle and not into the seats. If the retractor is attached to the seat, then the problem of movement of the seat dissolves. However, then, the stresses require expensive modification of the seat structure and must be anchored to satisfy the transmission of emergency stresses into the vehicle body and frame. Where requirements provide that the vehicle frame receive the stresses in an accident which locks up the seat belt restraints, then the question becomes one of how to do this without causing twisting, misalignment and improperly guided webbing over the body of the user.

Seats themselves do adjust and the U.S. Pat. No. 3,288,422 to Herbert Krause is illustrative of a seat frame secured to the vehicle floor and with an operating lever selectively moving operating latches in a slider track and engaging a carriage to which a seat frame is secured. To this structure it was intended that seat belts may be attached but there is no suggestion of a functioning retractor movable on the track.

In U.S. Pat. No. 3,897,101 to Peter Hess, a seat adjustment is shown which includes an inertia responsive lock for the seat. It does not suggest the inclusion of a seat connected retractor riding in a retractor cooperating track.

In U.S. Pat. No. 4,109,962 to Joseph J. Magyar, the seat construction includes a retractor but the retractor does not move in a track, nor does it serve a lap or shoulder belt. In the Magyar device, the short belt acts as an anchor extension from the floor so that the seat can move and the single position anchor to the floor is retained.

In the U.S. Pat. No. 2,798,539 to Kenneth R. Johnson, in a bench type seat, retractors are provided in the base of the seat frame but these, in turn, are anchored to the vehicle frame so as to offer no suggestion of a retractor changing position in a track with seat movement.

In the present invention, a track structure is provided which is generally parallel to the seat mounting track and is fastened to the vehicle floor or frame which allows a seat connected retractor to float backward, forward and up and down with adjusting movement of the seat. The main objective of such a structure is to approximate a constant relationship as between the occupant of the seat and the belt system components for consistent performance irrespective of size of seat occupant or position of the seat. The function of the retractor is not modified by the movement of the seat. Accordingly, the mounting of the present invention is useful with a wide range of retractor types, including the newer dual spool retractor systems as seen in passive restraints and in separate lap and shoulder belt combinations. The constant relationship of retractor to wearer is achieved by attaching a retractor to the seat and permitting the retractor to float back and forth on the track and to elevationally adjust on the track with seat movement so long as there is no locking of the retractor in an emergency as occurs by webbing withdrawal force upon sudden braking, deceleration or the shock of an impact of vehicle with a separate structure.

A benefit of the present invention is that a structural seat is not required since the loading of the seat belt, as occurs in an emergency, is transmitted into the floor of the vehicle via the connection of the track or channel element to the floor or vehicle frame. The retractor is thereby free to shift or float as foreward or aft adjustment of the seat occurs, and as elevation changes occur with the seat movement. However, when an emergency deceleration is experienced, this results in an upward loading of the webbing of the retractor overcoming the bias toward the free running condition of the retractor in the track. As this force is applied to the retractor, the retractor mount locks against any movement of the retractor in the track and the simplicity of the mechanism is appreciated by the fact that a lock pin or pawl on the retractor mount tilts with the tilting of the retractor into engagement with teeth provided on the track. The amount of force causing the pin or pawl to lock in the track is relatively small, simply enough to overcome the normal bias holding the lock pin away from the teeth. This is maintained at a minimum because there is no significant upward force on the retractor until the emergency stop situation and this assures quiet and free movement of the retractor on the track with movement of the seat.

Accordingly, the principal object of the present invention is to provide a seat attached retractor mount which normally freely floats in a track generally paralleling the fore and aft movement of a vehicle seat so as to maintain a constant webbing to user relationship.

Another object is to provide for elevational variations between seat and track during movement of the seat and retractor.

Another object is to provide a track mount structure for attachment to the floor and/or frame of an automobile on which a seat belt retractor can freely move in a fore and aft direction and which incorporates lock means cooperating with the forces on the retractor for prevention of movement in emergency decelerating situations.

Other objects, including economy, simplicity and adaptability on a variety of types of retractors and vehicles will be appreciated as the description proceeds.

IN THE DRAWINGS

FIG. 1 is a perspective view of a movable vehicle seat and having a retractor track adjacent thereto and upon which a retractor is mounted for movement thereupon and the track element is secured to the floor and frame of a vehicle.

FIG. 2 is a side elevation view of the retractor and track structure seen in FIG. 1 and partially cut away to reveal the spring biasing the lock from engagement with the teeth provided on the track and indicating the flexible connection as by helical spring of the retractor to the seat structure. The effect of an upward force of belt or webbing is appreciated by the phantom line position of the pawl portion.

FIG. 3 is a partial section elevation view of the structure shown in FIG. 2 and taken on the line 3—3 thereof and through the track structure.

GENERAL DESCRIPTION

The floating lock mount of the present invention flanks an adjustable seat and is attached to the floor, tunnel, or frame structure of the vehicle adjacent the seat and usually inboard of the seat. Bench seats are slotted to accommodate the floating mount. An elongate track is provided which has lock means along its length. A retractor frame is slidable on the track and includes a lock engaging means. The frame is tiltable when webbing withdrawal forces act on the frame and then the lock engaging means grabs the lock means on the track. The retractor frame is resiliently attachable to a vehicle seat so that as the seat moves, the frame shifts position on the track. The mount comprises an elongate track having depending integral teeth thereon. A retractor mounting sleeve is over and on the track and the sleeve includes a pawl or latch extension which extends upwardly toward locking engagement with the teeth. Normally the pawl is biased out of engagement with the teeth. A moving fulcrum exists as between sleeve and track which changes position with movement of the sleeve in accord with movement of the seat. To the sleeve is attached a retractor frame and a retractor which is of the emergency locking or inertial type. The retractor may be of the dual spool type or it may be simply a single spool retractor. The retractor and frame are freely movable on the track in fore and aft movement and where the track is inclined, the frame and keeper sleeve either climb or drop as the relative position between track and seat varies and this variance is accommodated by a resilient link. The resilient link is connected to the retractor and to the seat and provides sufficient rigidity or stiffness as to urge the retractor to movement with the movement of the seat and also allows elevational variations where the track is inclined by reason of its attachment to the vehicle frame or floor.

SPECIFIC DESCRIPTION

Referring to the drawing and with first particular respect to the FIG. 1 thereof, the present invention is appreciated in its setting of use. The floating lock mount 11 is seen adjacent an adjustable vehicle seat 12 on the outboard side thereof and generally parallel to the fore and aft adjustment capability of the seat. While not illustrated, the door of the vehicle is immediately adjacent the lock mount 11 where it is secured to the floor or frame 13 of the vehicle 14. In certain instances, the mount 11 may be positioned intermediate adjustable seats 12. The mount 11 is connected to the sleeve 15 and to the seat 12 by a stiffly resilient link or coupling 16. This allows the movement of the seat 12 to be translated to the sleeve 15 so that the sleeve is movable on the track 17 as the seat moves and so that there is ample flexure to accommodate variations in elevation between, say, the seat 12 and the track 17. On the sleeve 15 is mounted a retractor 19 so that as the relative position of the sleeve 15 shifts on the track 17, the relative position of the retractor 19 in respect to the seat 12 is relatively static. This results in continuous proper relationship of webbing or belt 20 about the lap or shoulder of the wearer occupying the seat 12, however the seat 12 is adjusted. Connectors 21 and 22 (fore and aft, respectively) at each end of the track 17 provide means to attach the track 17 and floating mount 11 to the vehicle 14. In the illustration in a standard United States vehicle, the seat 12 may be regarded as the driver's seat in a bucket seat arrangement on the left side of the vehicle 14 and facing in the direction of movement. Adjustable bench seat vehicles are similarly served and the retractor 19 trains the webbing 20 over the lap and/or shoulders of the user. (Both, where dual spool retractors are so mounted.)

Referring to the FIGS. 2 and 3, the details of construction of the floating retractor mount 11 can be better appreciated anchored to the floor 13 by means of the connector elements 21 (fore) and 22 (aft) as by the fasteners 23 and 24, respectively. The connector elements 21 and 22 serve as spacers elevating the track element 17. Connection to the track 17 is by means of bolts 25. The selected spacing depends upon the model and spacing and configuration of the vehicle floor 13 in respect to the adjusting provisions for the seats 12.

The track 17 is elongate and substantially channel shaped in cross section for a distance substantially equal to the fore and aft adjustment capability of the seat 12. The downturned flanges 26 of the track 17, as shown, include teeth 27 forming an elongate rack or ratchet 28. This provides track lock means as will be seen. The sleeve 15, which is generally channel shaped, is attached to the outwardly flared portions 29 of the flanges 30 and to the frame 31 of retractor 19. Where possible, the retractor frame 31 may be integral with the sleeve 15 and the sleeve 15 would include a lock engaging element which, upon tilting of the sleeve, engages the lock means of the track 17. The sleeve 15 is normally freely movable or slidable on the track 17 and free of the ratchet 28. On slight tilting, however, the sleeve 15, including the frame 31 of the retractor, rises on the fulcrum 32 between frame 31 and track 17 wherever it may rest against the track 17. The web portion 33 of the sleeve 15 includes a pawl 34 registrably beneath the teeth 27 of the rack 28 and normally out of contact with the teeth 27. This separation from contact is assured by the action of the spring 35 urging the sleeve 15 in the running or sliding relation on the track 17 as shown in full line. However, upon tilting (as by upward force exceeding the force of spring 35 applied by sudden withdrawal of webbing 20 from the retractor 19) the sleeve 15 tilts on fulcrum point 32 and the pawl 34 seats against the receiving teeth 27 of ratchet or rack 28 and thus freezing the retractor position in an emergency situation. The lock position of the pawl 34 is shown in phantom line in the FIG. 2.

The seat 12 includes a bracket element 40 which includes a mounting post 41. The resilient link or coupling 16 is attached to the post 41 supported on the bracket 40 and connected to the frame of seat 12. The coupling 16 is stiffly rigid as in the form of coil spring shown so as to push or pull the retractor frame 31 and sleeve 15 along the track 17 as the seat 12 is adjusted. The resiliency allows for elevational variances as the retractor changes position on the track 17 or as the seat 12 is varied elevationally as well as fore and aft. Connection of the resilient link 16 to the retractor 19 is at the headed pin 42 and secured for movement with the sleeve 15.

In operation, whatever seat adjustment occurs, the retractor retains its relative location in respect to the driver or passenger in the adjusted seat. The result of this construction is assurance of comfort and safety as a consequence of uniform presentation of webbing or belting, whatever adjustments are made in the seating. This arrangement is ideal to provide a consistent and uniform application of holding stresses to the body of the users of the webbing.

The retractor 19 is indicated as including an inertial lock mechanism 43 such as a pendulum means which, upon imbalance, reacts against the lever 44 to tilt the lock pawls 45 of the retractor 19 into lock-up engagement against the ratchets 46 of the retractor or retractors 19. When locked, as in an emergency situation, the webbing 20, under stress, lifts the retractor 19 and sleeve 15 against the bias of spring 35 and the floating lock mount 11 is frozen in place until the sensed crisis passes. Then the system is restored to free floating in accord with seat adjustment.

Having thus described my invention and an operative embodiment thereof, those skilled in the art will perceive improvements, modifications, and changes within the skill of the art and such improvements, modifications, and changes are intended to be embodied herein limited only by the scope of my hereinafter appended claims.

I claim:

1. A floating mount for a seat belt retractor serving an adjustable seat:
   - an elongate track for securing to a vehicle floor adjacent an adjustable seat and having lock means thereon for substantially its entire length;
   - a retractor frame supporting said retractor and including a track mount portion slidably mounted on said track and including a lock engaging element normally spaced apart from said lock means on said track;
   - a resilient coupling secured to said retractor frame and having a seat securing portion for connection to an adjustable automotive seat; and
   - a fulcrum between said track and retractor frame and upon which said retractor frame tilts upon sudden lifting force whereby said lock engaging element is lifted into lock engagement with said lock means on said track.

2. A floating mount for a seat belt retractor serving an adjustable seat:
   - an elongate track for securing to a vehicle floor adjacent an adjustable seat and having teeth thereon for substantially its entire length;
   - a sleeve slidably mounted on said track, said sleeve including a pawl in operable registry with said teeth and normally spaced apart therefrom;
   - mounting means on said sleeve for the attachment of a retractor thereto;
   - a resilient coupling connected to said sleeve and connectable to an adjustable automotive seat; and
   - a fulcrum between said track and said sleeve which changes location with movement of said sleeve on said track and upon which said sleeve tilts upon sudden lifting force on said sleeve whereby said pawl lockably engages said teeth.

3. A floating mount for a seat belt retractor in accord with claim 2 and wherein a light bias between said sleeve and said track urges said pawl normally away from engagement with said teeth.

4. A floating mount for a seat belt retractor as in claim 2 wherein said track includes terminal connector means for attachment to a vehicle floor or frame adjacent a vehicle seat.

5. In the combination structure of claim 4 wherein said terminal connectors of said track incline said track in respect to the floor of said vehicle and said vehicle seat.

6. A floating mount for a seat belt retractor, said mount connected to an adjustable vehicle seat and adjacent said adjustable seat comprising:
   - a track having a generally channel shaped cross section and inverted so that the flanges of said track depend and said flanges include ratchet teeth therealong, said track for securing to the vehicle floor adjacent an adjustable vehicle seat;
   - connector elements at each end of said track for connecting said track to a vehicle floor adjacent an adjustable vehicle seat;
   - a channel shaped mounting sleeve slidable upon said track and having a fulcrum point engaging said track and retractor mounting means and a pawl registrably oriented in respect of said teeth on said retractor;
   - a spring normally holding said sleeve and said pawl from tilting at said fulcrum point and engaging said ratchet teeth;
   - a stiffly resilient coupling element between said sleeve and said vehicle seat; and
   - a seat belt retractor secured to said sleeve and movable on said track with said sleeve in accord with adjusting movement of said seat and upon application of a belt withdrawing force in excess of said spring acting between said sleeve and said track causing said sleeve to tilt on said fulcrum and said pawl to lockably engage said ratchet teeth.

* * * * *